United States Patent [19]
Liebig

[11] Patent Number: 6,109,020
[45] Date of Patent: Aug. 29, 2000

[54] COMBINED CYCLE POWER PLANT WITH A ONCE THROUGH STEAM GENERATOR

[75] Inventor: Erhard Liebig, Laufenburg, Germany

[73] Assignee: Asea Brown Boveri AG, Baden, Switzerland

[21] Appl. No.: 09/119,671

[22] Filed: Jul. 21, 1998

[30] Foreign Application Priority Data

Jul. 28, 1997 [EP] European Pat. Off. .............. 97810537

[51] Int. Cl.[7] .................................................. F02C 1/00
[52] U.S. Cl. ......................... 60/39.182; 60/646; 60/657
[58] Field of Search .............................. 60/39.182, 646, 60/657

[56] References Cited

FOREIGN PATENT DOCUMENTS

| | | |
|---|---|---|
| 0359735A1 | 3/1990 | European Pat. Off. . |
| 0475212A2 | 3/1992 | European Pat. Off. . |
| 0561220A1 | 9/1993 | European Pat. Off. . |
| 0777036A1 | 6/1997 | European Pat. Off. . |
| 19544225A1 | 6/1997 | Germany . |
| 61-215407 | 9/1986 | Japan . |

*Primary Examiner*—Noah P. Kamen
*Attorney, Agent, or Firm*—Burns, Doane, Swecker & Mathis, L.L.P.

[57] ABSTRACT

In a combined cycle power plant with a gas turbine circuit and a steam turbine circuit, the exhaust gases from a gas turbine (4) transfer their residual heat to a steam turbine (9, 10) via the working medium flowing in a once through steam generator (7). The deaeration of the working medium is carried out in the hot well (12) of the steam turbine condenser (11), the deaerated working medium is introduced directly from the hot well of the condenser via a feed pump (14, 20) into the preheating surfaces (15, 21) of the once through steam generator, and a separating bottle (25) for the blowdown of impurities is arranged between the evaporation surfaces (16, 22) and the superheating surfaces (19, 23).

4 Claims, 1 Drawing Sheet

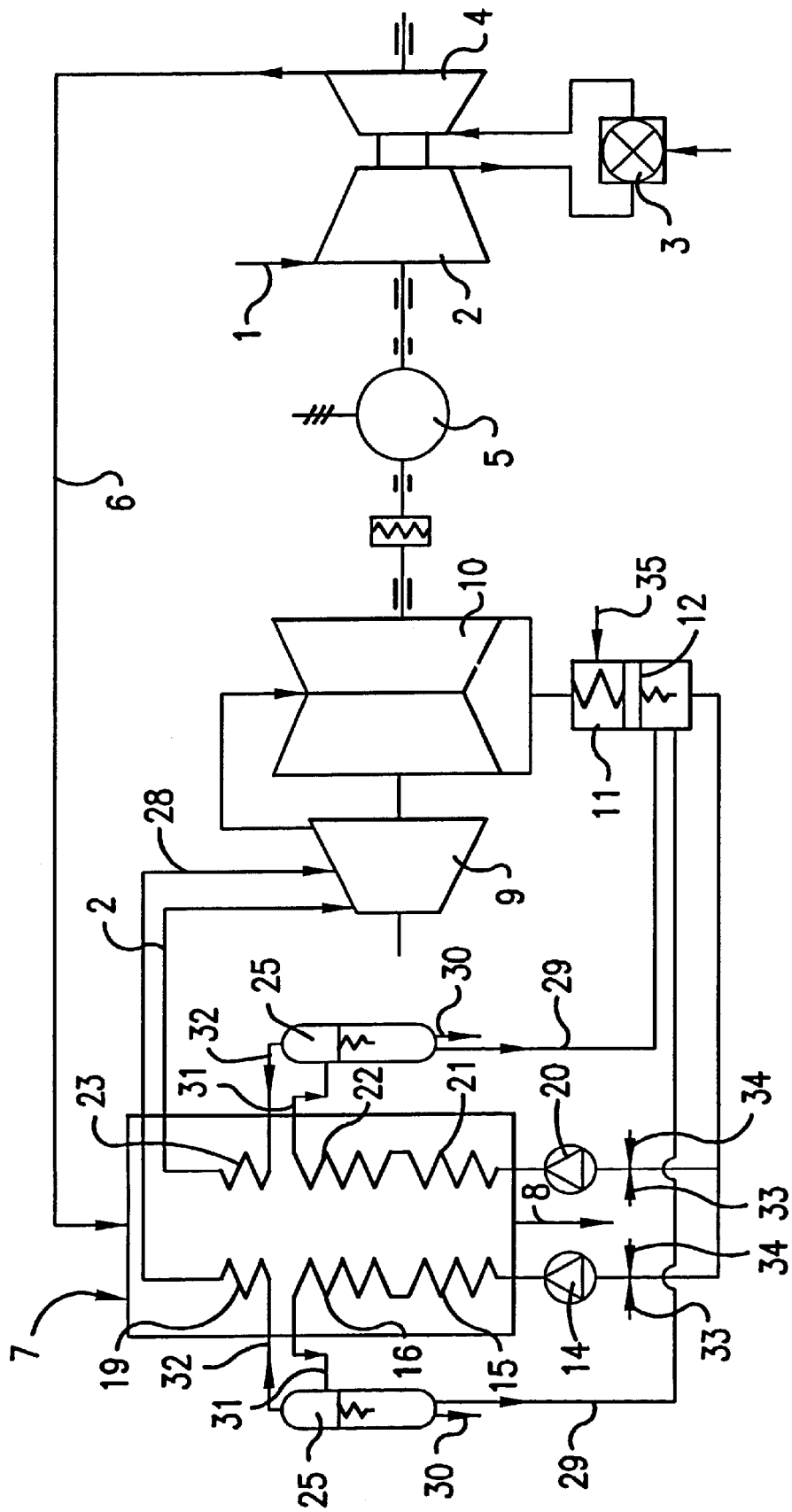

COMBINED CYCLE POWER PLANT WITH A ONCE THROUGH STEAM GENERATOR

BACKGROUND OF THE INVENTION

1. Field of the Invention

The invention relates to a combined cycle power plant with a gas turbine circuit and a steam turbine circuit, and more particularly, to a combined cycle power plant wherein the exhaust gases from a gas turbine transfer residual heat to a steam turbine via the working medium flowing in a once through steam generator.

2. Background of the Invention

The water/steam circuit of current combined power plants is operated, without exception, on the basis of subcritical parameters. As a rule, the heat recovery steam generator for utilizing the waste heat from the gas turbines is designed with a drum boiler, with a once through boiler or with a combination thereof. In the case of large highly efficient plants, multiple pressure plants with reheating are sometimes used. However, in comparison with conventionally fired boilers, the flue gas temperature in the case of heat recovery steam generators is limited. In particular, the evaporation which occurs at a constant temperature leads to thermodynamic and technical design constraints.

At the present time, heat recovery steam generators for utilizing the waste heat from gas turbine plants are designed, as a rule, with drum boilers. The steam circuit is cleaned by upgrading in the respective drum and by continuous or discontinuous blowdown of the drum. Upgrading occurs because the water evaporates in the boiler drum. Nonvolatile substances therefore remain in the boiler water and are increasingly upgraded. With the blowdown of the boiler water, the substances are consequently efficiently removed in concentrated form from the circuit. Moreover, in many instances, a solid alkalizing agent, such as trisodiumphosphate or sodium hydroxide, is added to the drum water in order to adjust the pH value in the boiler.

However, if the heat recovery steam generators are provided with a simple once through boiler, this cleaning mechanism is not used, since such a boiler cannot be blown down. The cleaning of the water/steam circuit is carried out, in this case, in a condensate polishing plant, in which the condensate is filtered, before being introduced into the steam generator, and, if appropriate, is additionally desalinated by means of ion exchangers.

However, in both types of boilers, one problem is that many undesirable substances, such as, chlorides and sulfates, are present in a volatile form, for example, HCl or $H_2SO_4$. This also applies to conventional circuit conditioning with ammonia in the form of volatile ammonium chlorides or of ammonium sulfates. Such materials may lead to corrosion and consequently to operating faults and damage.

A heat recovery steam generator working with a drum boiler in a low-pressure system and with a once through boiler in the high-pressure system is known from EP-A1-0,359,735. In order to make the plant simpler and more efficient, however, in the disclosed plant the drum also performs the function of the feedwater tank/deaerator, such that the steam drum is provided with integrated deaeration.

SUMMARY OF THE INVENTION

Accordingly, one object of the present invention is to provide a novel plant which is restricted to the thermodynamically necessary elements of the water/steam cyclic process, thereby resulting in considerable cost reduction.

The plant of the present invention is able to manage without a condensate polishing plant, without a feedwater tank/deaerator and without a steam drum. This is based, on the one hand, on the fact that metering with nonvolatile conditioning agents had strictly been dispensed with until now for once through boilers since these agents would be precipitated in the superheated boiler parts, and, on the other hand, on the knowledge that, where drum boilers are concerned, due to the addition of alkalizing agents the volatility of said chlorides and sulfates is drastically reduced so that these substances can easily be blown down, for example, in the case of phosphate conditioning of the boiler water.

The advantages of the invention are to be seen, inter alia, in a considerable reduction of the plant and operating costs, in the reduction of risk due to the absence of a chemical plant in the water/steam circuit, and in an extreme simplification of the system, with the result that an improvement in reliability and availability may be expected.

Thus, the present invention provides a heat recovery steam generator with a once through boiler having a separating bottle, wherein the impurities can be drawn off from the separating bottle (as when used for a drum boiler), if the separating bottle is operated under specific predetermined conditions.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, FIG. 1, which illustrates diagrammatically an exemplary embodiment of the invention with reference to a combined cycle power plant. Only the elements essential for understanding the invention are shown, with the direction of flow of the working media being illustrated by arrows.

DESCRIPTION OF THE PREFERRED EMBODIMENT

Referring now to FIG. 1, in the illustrated gas turbine system, fresh air which is drawn in via a line 1 is compressed to the working pressure in a compressor 2. The compressed air is heated in a combustion chamber 3 which is fired, for example, with natural gas, and the fuel gas thus obtained is expanded in a gas turbine 4 so as to perform work. The energy thus obtained is transferred to a generator 5 or the compressor 2. The still hot exhaust gas from the gas turbine 4 is supplied from the outlet of the gas turbine, via a line 6, to a heat recovery steam generator plant 7 and, after the heat is transferred, the exhaust gas is led from the latter into the open via a line 8 and a stack which is not illustrated.

In the water/steam circuit, a multiple casing steam turbine 9, 10 is arranged on the same shaft as the gas turbine 4. The working steam expanded in the low-pressure turbine 10 condenses in a condenser 11. The condensate is conveyed from a hot well 12 by a pump 14, 20 directly into the steam generator 7. It is notable that the plant of the present invention is not equipped with either a condensate polishing plant or with a feedwater tank/deaerator which, as a rule, is steam heated.

The heat recovery steam generator plant 7 is designed as a vertical boiler and, in the present case, works according to a dual pressure steam process. Of course, a horizontal boiler could also be used. The number of pressure stages could also, of course, be varied, as would be apparent to one skilled in the art.

The low-pressure system is designed as a once through system. It includes, in the flue gas path of the boiler, a low-pressure economizer 15, into which the condensate is introduced via a feed pump 14, a low-pressure evaporator 16 and a low-pressure superheater 19. The superheated steam is carried over into a suitable stage of the medium pressure steam turbine 10 via a low-pressure steam line 28.

The high-pressure system is also designed as a once through system and can therefore be designed both for subcritical and for supercritical parameters. It essentially includes, in the flue gas path of the boiler, the high-pressure economizer 21, the high-pressure evaporator 22 and the high-pressure superheater 23. The working medium is supplied to the high-pressure economizer 21 via a high-pressure feed pump 20. The superheated steam is carried over into the high-pressure part 9 of the steam turbine via a live steam line 24.

For phase separation, a separating bottle 25 is provided in each of the two pressure systems, the outlet of the evaporators 16, 22 opening via a line 31 into said separating bottle, respectively. The separating bottles are connected, at their upper end, to the superheater 19, 23 via a line 32. At their lower end, the bottles are each provided with a return line 29 which opens into the hot well 12. At their lower end, each of the bottles is also provided with a blowdown line 30, through which the impurities are drawn off. The quantity of steam drawn off through line 30 is replaced by additional water which is introduced into the condenser at 35.

The separating bottle 25 ensures that the superheater 19, 23 remains dry at all times and that superheated steam is available at the boiler outlet at an early stage. As soon as the pressure necessary for stable operation is reached in the high-pressure evaporator 22, the live steam can be used for starting up the steam turbine in a sliding pressure mode.

According to one object of the present invention as described above, it is thus possible, in principle, to dispense with a condensate polishing plant. This is based on the realization that the impurities in the water/steam circuit can be drawn off in the region of the separating bottles 25 as further explained below.

The water/steam circuit of the present invention can be cleaned both under full load and under part load. Under full load, the high-pressure system is overfed, that is, a larger quantity of water than is necessary is conveyed through the once through steam generator via the high-pressure feed pump 20. As should be apparent to one skilled in the art, if a single high-pressure feed pump is used, it must be designed to be correspondingly larger for the extra quantity of water. If the plant is provided with pump redundancy, for example in the form of 2×100% or 3×50%, the replacement pump may be employed to accomplish this overfeeding.

The conveyed water quantity is adjusted in such a way so as to ensure that wet steam passes into the bottle 25. The impurities are bound in the water droplets of the water/steam mixture. In the bottle, the water fraction of the steam is separated by suitable means and is drawn off via the blowdown line 30. One advantage of this method is that the impurities are largely removed from the circuit even after only a few passes, that is, within a very short time.

In a variant of the invention, in which circuit cleaning can be carried out by means of the feed pump dimensioned for normal operation, the steam generator is operated under part load, for example 80%. Accordingly, as in the full load method, the high-pressure system is overfed and the procedure is the same as in the method described above.

The present invention also provides a further measure which reduces the volatility of the substances present and therefore makes it easier to separate them from the circuit. This is carried out by metering a conditioning agent and results in an advantageous reduction in the distribution coefficient. Since the above-described cleaning of the water/steam circuit via the separating bottle 25 requires the plant to operate in a special mode for a limited time, the metering of chemicals, i.e., conditioning agents, is also carried out only during this cleaning period, in which the separating bottle is operated under wet conditions. The chemicals are introduced into the feed line at 34, upstream of the feed pumps 14, 20, by suitable means. By virtue of this measure, the two pressure systems can be metered independently of one another as a function of their thermal states.

The actual metering, that is the chemical to be used and its quantity, is carried out, in this case, as a function of the nature and degree of the impurity. Metering takes place continuously during the entire cleaning process. Ammonium metering ($NH_3$) and oxygen metering ($O_2$ gas) occurring for normal operation, which likewise takes place upstream of the feed pumps 14, 20 at 33, are adjusted by means of conditioning agents during cleaning. However, this is not an absolute condition, but depends on the nature of the impurity and therefore on the conditioning agent to be used.

The general outcome is that, during normal operation, the separating bottle 25 is dry and there is no metering of chemicals in order to reduce the volatility of particular impurities. In contrast, wet steam has to pass into the bottle for cleaning under full load or under part load. According to the method described above, the necessary moisture passes into the bottle as a result of the overfeeding of the system, this being achieved by increasing the mass flow of feedwater and/or by running down the gas turbine. The reduction in volatility by means of chemicals, which is carried out during this cleaning operation, improves the degree of separation, which is particularly important with regard to the volatile substances. Moreover, this measure leads to a shortening of the cleaning operation.

In the instance shown in FIG. 1, the inlet temperature into the boiler corresponds to the condensate temperature, since no steam-heated feedwater tank/deaerator is provided. Advantageously, the material for the so-called preheating surfaces of the once through steam generator is selected as a function of the gas turbine fuel and, in particular, its sulfur content and as a function of the condensate temperature, in order to prevent dew point corrosion. With a falling waterside inlet temperature, on the one hand, and/or with an increasing sulfur content, on the other hand, a transition can be made from simple carbon steel via low alloy steel to stainless steel.

Of course, the invention is not restricted to the plant shown and described. The invention can be used irrespective of the type and design of the heat recovery steam generator and steam turbine plant, of the condensation system, of the presence of intermediate superheating, of the gas turbine plant and of the selected startup process. A horizontal boiler may be employed in contrast to the arrangement shown and described.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A combined cycle power plant with a gas turbine circuit and a steam turbine circuit, comprising:

means for transferring residual heat from the exhaust gases of a gas turbine to a steam turbine via a working medium flowing in a once through steam generator, means for carrying out a deaeration of the working medium in a hot well of a steam turbine condenser, wherein the deaerated working medium is introduced directly from the hot well of the condenser via a feed pump into preheating surfaces of the once through steam generator, and wherein a separating bottle for a blowdown of impurities is arranged between evaporation surfaces and superheating surfaces of the once through steam generator.

2. The power plant as claimed in claim 1, further comprising, during normal operation, means for permitting the metering of ammonium and oxygen to be carried out, and when operating in a cleaning mode, means for permitting a conditioning agent to be metered which reduces the volatility of the substances present and increases the ease of separation thereof from the circuit.

3. A method of operating a combined cycle power plant with a gas turbine circuit and a steam turbine circuit, comprising:

transferring residual heat from exhaust gases from a gas turbine to a steam turbine via a working medium flowing in a once through steam generator, deaerating the working medium in a hot well of a steam turbine condenser, introducing the deaerated working medium directly from the hot well of the condenser via a feed pump into preheating surfaces of the once through steam generator, and arranging a separating bottle for the blowdown of impurities between evaporation surfaces and superheating surfaces of the once through steam generator.

4. The method as claimed in claim 3, further comprising, during normal operation, metering ammonium ($NH_3$) and metering oxygen ($O_2$ gas), and, when in a cleaning mode of operation, metering a conditioning agent which reduces the volatility of the substances present and which improves the ease of separating the substances from the circuit.

* * * * *